3,051,664
PROCESS FOR THE PRODUCTION OF HIGH IM-
PACT TYPE CASTINGS BY THE COPOLYMERI-
ZATION OF EPOXY COMPOUNDS WITH AMINES
Stanley Turner, Whittier, Calif.
(2136 Wallace St., Costa Mesa, Calif.)
No Drawing. Filed Nov. 25, 1957, Ser. No. 698,383
5 Claims. (Cl. 260—2)

This invention relates to a process to copolymerize certain amines with compounds containing the 1,2-epoxy group

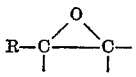

The polymers formed are principally applied as thermosetting casting resins; however, said amines and process are also adaptable to producing permanently thermoplastic polymers which may be reformed under heat and pressure. These amine epoxy copolymers will sometimes be referred to herein as epoxy resins.

This application is a continuation-in-part of my copending application Serial No. 367,757, filed July 13, 1953, now abandoned.

In the polymerization of epoxy monomers to produce resins a terrific amount of exothermic heat is generated. Moreover, the epoxy monomers undergoing reaction and the epoxy resins produced therefrom have such low heat conductivity that in order to transfer any appreciable amount of heat from the reacting mass in a short time the mass must be agitated to insure contact with the available heat transfer surface.

As heretofore practiced, in the polymerization of epoxy monomers the liquid stage through which the mass passes prior to gel formation and solidification has been of short duration. Due to this short liquidation period agitation of the reacting mass becomes impossible, and this in turn makes it impossible to dissipate or even to control the great amount of exothermic heat evolved. The result has been that the center of the reacting mass soon reaches a temperature at which the reactants start to boil, oftentimes violently. This is detrimental to the gel structure and results in brittleness and cracking of the final resin product. It has also rendered it impossible to produce epoxy resins in large thick masses, such as large castings that are used for metal forming dies in industrial operations, and has forced the trade to confine such castings as may be made from such resins to thin sections. This has obviously greatly narrowed their field of use.

Another, and very great disadvantage attending these epoxy resins as heretofore produced, is their very short "pot-life," i.e., once the initial reactions have started and before the mass gels, or in other words, the length of time the mass will remain liquid. This is particularly disadvantageous when it is desired to use the liquid resinous material for "wet lay-up laminating" work, where a material is to be built up to a given size by applying the liquid as a "paint" to various layers of material before the hardening or thermosetting operation takes place. The pot life of epoxy resins as heretofore produced is very short, usually a matter of a few minutes at normal room temperature.

In an effort to control the exothermic heat of reaction and overcome these difficulties resort has been had to the use of filler material to dilute the reacting mass. This, however, gives a weakened product and is otherwise generally unsatisfactory. The epoxy compounds or monomers which have heretofore been employed to produce the thermosetting resins have been of the di-epoxy type as illustrated by the formula

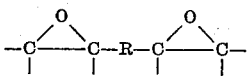

i.e., they have been limited to compounds having only two epoxy groups per mol. As is well known, di-functional molecules of themselves can form only lineally linked polymerization products. Therefore, any cross-linkage that may be effected when only di-epoxy monomers are used to produce the polymerized resin products would have to depend upon the amine linking agents employed being more than di-functional, i.e., of having more than two liable hydrogen atoms, or acting as catalyst to promote ether bond polymerization between the epoxy molecules, or both. The polyfunctional linking agents which have been thus employed have been various polyfunctional amines, generally such compounds as diethylene triamine, piperidine, N,N-diethyl-1,3-propanediamine.

The common epoxy monomers of commerce are condensation products of bisphenol and epichlorohydrin. They are most frequently described as epoxy resins. They are usually partial polymers, said polymerization occurring thru ether bonds, the condensation and polymerization reactions going on simultaneously. These partial polymers have terminal epoxy groups and are further polymerized in use. They are described as "di-epoxies," but are actually mixtures of di- and mono-epoxies as their epoxide equivalency never reaches 2. An epoxide equivalency of 1.3 to 1.6 is common for commercial epoxy partial polymers.

In polymerizing epoxy compounds with amines, 3 systems are possible:

(1) Polymerization proceeds thru ether bonds only

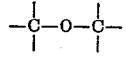

(2) Polymerization proceeds thru both amino and ether bonds

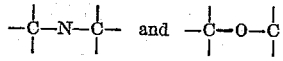

(3) Polymerization proceeds thru amino bonds only

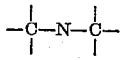

(1) Tertiary amines, have no liable hydrogen to react with the epoxide group, the only polymerization that can occur is the reaction of an epoxide group with a hydroxyl hydrogen. The polymer grows thru carbon, oxygen, carbon bonds. When an epoxy group reacts and forms an ether bond, it regenerates a hydroxyl, a diepoxy molecule then becomes tetrafunctional under these conditions and cross links to these regenerated hydroxyls forming thermosetting polymers. These amines function solely as catalyst and do not become part of the polymolecule. Piperidine has one liable hydrogen; it reacts with an epoxy group and becomes a catalyst attached to a side chain of an all ether bond polymer.

(2) Polyfunctional amines, such as diethylene triamine, and N,N-diethyl-1,3-propanediamine. These amines have liable hydrogen to react with epoxy groups; they are also strong catalyst for ether bond polymerization. These and similar amines having 2 or more liable hydrogen per mol react with epoxy compounds to produce mixed polyamino and ether bond polymers. The usual rate of use of these amines is in the range of .5 amino hydrogen to 1 epoxide equivalent. If one assumes all amino hydrogen reacts, the polymers are then approximately 50% amino bonds and 50% ether bonds.

(3) Amines such as aniline, toluidine and xylidine have no catalytic effect to promote ether bond polymerization. They must be used in the ratio of 1 amino hydrogen per epoxide equivalent of the epoxy compound. They are coreactants and copolymerize with epoxy compounds to form epoxy amino copolymers free of ether bonds.

As has been previously stated, with the use of these prior amines for the production of resins from epoxy monomers, the exothermic heat of reaction has been extremely difficult, if not impossible, to control, and the aforesaid disadvantages and difficulties have attended the process.

A primary object of my invention is to provide a method for producing thermosetting resins from epoxy compounds in which method the exothermic heat of reaction can be controlled and the aforesaid difficulties and disadvantages eliminated, and by which new thermosetting epoxy resins superior to any heretofore produced can be made having materially longer "pot life" in the liquid or pre-gelling stage, and possessing greater strength as witnessed by their ability to withstand tensile compression and impact stresses.

It is still another object to produce thermosetting resins from epoxy compounds having different and controlled degrees of hardness, toughness, and flexibility.

In my process, in contrast to the polyfunctional amines heretofore employed, I use as linking agents amines which are only bifunctional. More particularly, I employ amines which are primary and mono in nature. Being primary, there are 2 hydrogen atoms on the nitrogen; and being mono, there is only 1 nitrogen in each molecule comprising my linking agents. Furthermore, in connection with my linking agents I take advantage of the fact that certain of the mono primary amines, after the first amino hydrogen has reacted to break or open one of the epoxy rings of the epoxy monomer, possess and exhibit a steric hindrance which prevents the other amino hydrogen from reacting at a rate faster than the exothermic heat of the reaction can be controlled. At the same time any of the hydrogens not bound on the nitrogen are prevented from taking part in the reaction, so that all of the hydrogens reacting in one molecule are bound on the nitrogen.

Examples of the mono-primary amines which exhibit the steric hindrance required for my process of converting the epoxy monomers into resins are those where the nitrogen is attached to a carbon atom in the benzene ring, as in the case of aniline, toluidine, phenetidine, cyclohexylamine and xylidine, and those where the nitrogen is attached to a tertiary carbon, as in the case of tertiary octylamine.

I use these linking agents in quantity such that there is 1 of the 2 hydrogens attached to the nitrogen for each epoxy group of the monomer compound. This is at the rate of one NH₂ group for each two epoxy groups of the monomer compound.

The steric hindrance exhibited by these amines is a relative condition. The first hydrogen of each amine reacts at a rate considerably greater than that of the second hydrogen. This allows one to choose a temperature at which the first amino hydrogen will react at a practical rate, while reaction of the second amino hydrogen is practically nil. With only one hydrogen of each amine reacting, no polymer formation is taking place; the reaction product remains fluid. It may be readily agitated in a vessel fitted for cooling, and maintenance of the first stage reaction temperature is accomplished by dissipating the exothermic heat of reaction as soon as it is formed.

To complete the second stage of this reaction the temperature is slowly raised to 140°–160° C. over a period of several hours and held there for an additional 24 to 72 hours until polymerization is complete.

Substitution in the ring of these amines increases this steric hindrance. At the ortho position it shows the greatest effect, at meta position less effect, and at para position little or none.

The molecular weight of the epoxy compound per epoxide equivalent also affects the hindrance. For equivalent weights of 90 and above the least hindered amine, aniline, may be used, and a first stage reaction temperature up to 80° C. For an extremely active epoxy compound such as 1,2,3,4-di-epoxy butane, ortho toluidine should be used and a first stage reaction temperature below 40° C. employed. Aniline, and ortho and meta toluidine appear to best fulfill all requirements for the amine in this process. The more highly substituted amines have not shown any advantage over them, and polymerized resins employing them have consistently shown lower strength values than their counterparts employing aniline or toluidine.

Epoxy compounds suitable for copolymerizing with these amines are essentially any epoxy compound having an actual epoxide equivalency of 2 or greater. As my amines have but 2 reactive hydrogen and do not catalyze ether bond polymerization, they are not suitable to polymerize epoxy compounds with epoxide equivalencies of less than 2. This eliminates the bisphenol epichlorohydrin reaction products. The large amount of monoepoxide molecules, they contain, short stops the chain growth and result in polymers of low molecular weight and poor strength values.

It will thus be seen that with linking agents which are bifunctional I do not, and in fact, cannot, depend upon the linking agent to effect the cross-linking which is so necessary to form thermosetting resins. In fact, if my linking agents are employed with di-epoxy monomer compounds there would result only lineal linkage and consequently, only thermoplastic resins. Therefore, in order to get cross-linkage I look to the epoxy monomer compounds, employing those which have more than 2 epoxy groups.

In particular, I employ a tetra epoxy monomer compound such as the tetra glycidyl ether of pentaerythritol represented by the following structural formula:

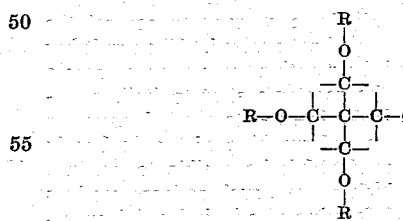

where R represents the group

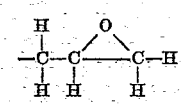

It will be seen that in this tetra epoxy monomer compound with its 4 epoxy groups I have an epoxy monomer which, by its reaction with my aforesaid mono-primary amine linking agent, is potentially available for the building up of polymerization compounds which are both lineally-linked and intricately cross-linked.

*Example I.*—As a preferred example of the practical application of my method for making thermosetting resins, 360 grams of the tetra glycidyl ether of pentaerythritol are mixed with 186 grams of aniline and the mixture kept well agitated in a vessel fitted with a cooling jacket in which conventional cooling water is circulated so as to hold the temperature of the reactants at or somewhat below about 80° C. An alternate and somewhat quicker procedure is to heat the epoxy to about 60° C. and then start adding the aniline slowly. When the heat of the reaction has raised the mass to about 80° C. the cooling water is started and regulated to hold the temperature at around 80° C. while the balance of the aniline is added. In either procedure, after from one-half to one hour after all of the aniline as been added, depending upon the size of the batch being processed, and during which time the mass is easily agitated, the temperature starts to fall. At this point the cooling is slowed, and finally stopped when the temperature starts to fall without cooling.

At this stage in the operation the mass is very liquid and will not gel for several hours if held below the 80° C. If held at around 20° C. the mass will remain liquid for several days. It will thus be seen that it has a remarkably long "pot-life" in contrast to the comparative short period which is characteristic of the epoxy resins as heretofore made. At this point we do not as yet have the polymerizzation and cross-linking which forms the final resin. In fact, what has thus far taken place is that only one of the two hydrogens on the nitrogen has reacted as illustrated by the following equation:

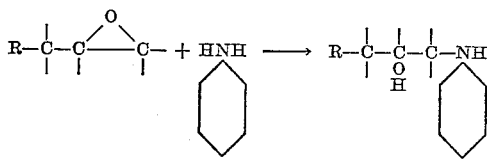

and we have merely the reaction between two molecules to form an intermediate, so to speak, which becomes a monomer for subsequent polymerization of these said monomers, and it is in this stage that the steric hinderance is exhibited to prevent the remaining liable hydrogen on the nitrogen from reacting at a rate faster than its heat of reaction can be dissipated. When the temperature begins to fall in the absence of cooling it indicates that the first hydrogen has reacted sufficiently that no violent exothermic reaction will occur on further polymerization.

Going on with the operation: In order to complete the polymerization it is necessary to apply heat, and when the temperature of the liquid mass has dropped to 50° or 60° C. or thereabouts it is poured into a mold and placed in a hot air oven and the temperature gradually raised over a period of from two to four hours to 130°–140° C. and held at that temperature. At around 105° C. activity begins to pick up, indicating that the second hydrogen on the nitrogen has begun to react, and the first gel begins to form. After this initial surge the reaction proceeds very slowly. After about 24 hours the mass has reached a stage of solidification which corresponds, on the average, to about 95% or better of the ultimate polymerization to be obtained, although I have found that the strength may be increased gradually with longer periods say up to 72 hours' exposure to the oven temperature. The mass is now ready for removal from the mold.

I have not found it necessary to go above 140° C. to get complete reaction using aniline. A somewhat higher temperature may be employed for the ring substituted amines, up to 160° C., although there would be no chemical disadvantage in using an oven temperature up to around 200° C. with any of my aromatic amines.

*Example II.*—Employing the procedure of Example I, 279.36 grams of aniline are combined with 604.7 grams of the triglycidyl ether of trimethylolpropane. The temperature of the first stage reaction is held between 60°–70° C. The temperature of the polymerization reaction is 140°–160° C.

*Example III.*—Employing the procedure of Example I, 321.45 grams of m-toluidine are combined with 390.42 grams of diglycidyl ether. The temperature of the first stage reaction is held at about 40° C. The temperature of the polymerization reaction is 140°–160° C.

*Example IV.*—Employing the procedure of Example I, 372.5 grams of aniline are combined with 390.4 grams of diglycidyl ether and 180 grams of pentaerythritol tetra glycidyl ether. The temperature of the first stage reaction is held near 40° C., when the reaction slows and the temperature begins to fall, cooling is stopped and the temperature is allowed to raise to 70° C. and held there for the duration of the first reaction. The temperature of the polymerization reaction is 140–160° C.

With my process the size or weight of resin castings that may be made without suffering deterioration, is virtually unlimited. This is in marked contrast to casting resins heretofore made from epoxy compounds as witnessed by the fact that with diethylene triamine as the linking agent a casting of only two pounds is too large to control the heat of reaction during its formation. My casting resins have much higher tensile, compression, impact and flexural strength than casting resins heretofore produced. For example, casting resins made by my process have been found to withstand compression tests to 36,000 p.s.i., tensile tests to 15,000 p.s.i., and impact tests to 15.0 footpounds.

Polyepoxide compounds for use in this polymerization process may be produced by the processes disclosed by Greenlee in U.S. Patent No. 2,510,885, columns 5 and 9.

Polyepoxides obtained by Greenlee's process seldom contain more than 2.5 epoxide equivalents per average molecular weight. When they are copolymerized with the amines and reaction conditions of my process, they produce highly resilient, flexible, but strong polymers. These polymers are very useful as the punch of a drop hammer die used for forming sheet metal. They are, however, too soft to use in other applications requiring rigid plastics.

Epoxide equivalents substantially below the theoretical are a result of unwanted polymerization reactions in both the polychlorohydrin reaction and removing the hydrogen and chlorine to close the epoxy ring. These side reactions can be substantially reduced by employing an alternate procedure; i.e., .1 mol boron trifluoride piperidine complex and 2 mols of monopentaerythritol and are dissolved in 3 mols ethylene glycol with heat and agitation. It is then cooled to 50°–60° C. continuing agitation. Some of the pentaerythritol precipitates from solution as a fine white flocculent, but stays dispersed; 14 mols of epichlorohydrin are then added. This dispersion, kept well agitated to keep any precipitated pentaerythritol finely dispersed, is pumped through a reactor consisting of 50 ft. of stainless steel tubing of .117 inch inside diameter, said tubing being immersed in a heating bath maintained at 160–170° C. The end of this tube is coupled to a short cooling section with an adjustable pressure relief valve. The speed of the pump and the setting of the discharge valve are adjusted so that no unreacted epoxy groups of the epichlorohydrin appear in the reaction product.

The reaction product is then fractionally distilled to yield the di-glycerolchlorohydrin ether of ethylene glycol, the tetra glycerolchlorohydrin ether of pentaerythritol, and some partially reacted and some polymeric compounds.

The second phase of this reaction involves removing hydrogen and chlorine from the chlorohydrin to close the epoxide ring. A ball mill is charged with 4 mols sodium zincate and 600 mls. of dioxane and milled for 10 hours. One mol of tetra glycerolchlorohydrin ether of pentaerythritol from the first reaction is added and milling continued for 30 minutes. This mixture has a paint-like consistency; it is reacted in an apparatus similar to the first phase reaction. The coil is 100 ft. long. It is mounted vertically with the pump at the top. A short cooling section and a venturi restrictor valve are mounted at the bottom. A reaction temperature of 140–150° C. is used. The reaction product which extrudes from the valve has a plastic-like consistency. It is collected in a container of dioxane. The solids settle to the bottom. The top phase is decanted and filtered until it has a neutral pH.

The mixture of polyepoxies left after the dioxane is distilled off has an epoxied equivalency of 3.2. Employing molecular distillation this mixture may be separated into tetra glycidyl ether of pentaerythritol, and a mixture of polymeric products.

The diglycerolchlorohydrin ether of ethylene glycol obtained in the first reaction can be processed in a similar manner to yield a product from which the pure diglycidyl ether of ethylene glycol can be distilled.

The amines which I employ as linking agents in the polymerization of epoxy compounds having more than 2 epoxy groups, for the production of thermosetting resins, are also useful and beneficial as linking agents in the polymerization of di-epoxy compounds, such as diglycidyl ether, 1,2-3,4-epoxy butane, and glycol diglycidyl ethers, etc. However, since my linking agents are bifunctional, as hereinabove pointed out, the resins I make from the di-epoxy compounds are thermoplastic rather than thermosetting, lineal linkage only being effected. These thermoplastic resins, when polymerized from high purity diepoxies and amines using exactly one amino hydrogen per epoxide group, are very high molecular weight strong, tough products. Their dark color and high cost will probably exclude their use in the general field of thermoplastic resins. I have, however, found a particularly good and useful purpose for thermoplastic resins made from di-epoxy monomer compounds. When copolymerized with the poly-epoxy compounds, such as the above described tetra-epoxy compound, they modify the tetra molecule whereby I am able to introduce a flexibility characteristic as desired into the thermosetting resin. As the amount of di-epoxy is increased the relative amount of cross-linking to lineal-linking is decreased to give a product with different degrees of flexibility. Thus, I have here a copolymerization whereby I can at will control the amount of cross-linking. In doing this the amount of aniline or other of my linking agents, is used in the same proportion for each epoxy molecule in the copolymer mixture as if each were being polymerized separately; i.e., one amino hydrogen for each epoxy group.

These polymers, containing only carbon-nitrogen-carbon linkage as formed in their final polymerization reaction, form a symmetrical chain which can grow to a much greater molecular weight than has been possible with other casting resins. The secondary hydroxyl groups, formed when an epoxy group reacts with an amino hydrogen, are nonreactive in this system. The spacing and amount of cross-linkage relative to linear linkage is predetermined by the selection of the epoxy compounds. The random polymerization of ether linkage systems is avoided.

These high molecular weight symmetrical polymers manifest a degree of toughness and dimensional stability heretofore unknown in casting resins.

It will be understood that the examples given hereinabove are exemplary in nature, that various changes and modifications may be made thereto without departing from the spirit of the invention, and that there is comprehended within the invention such modifications as come within the scope of the following claims.

I claim:
1. The process for the production of tough, high-impact type, open mold castings through the copolymerization of epoxy compounds with amines while controlling the exothermic heat of reaction during said production, which comprises: providing an epoxy compound having only terminal 1,2-epoxy groups, with no other cyclic structure or functional groups in their molecular structure, and wherein the number of said epoxy groups is a number from 3 to 4; admixing with said epoxy compound a primary mono amine, the amount of said amine being such that there is one amino hydrogen for each said 1,2-epoxy group of said epoxy compound, and said amine being one with the nitrogen atom attached to a carbon atom of a six-carbon ring having no other functional group attached to said ring; stirring the mixture to keep the temperature therein substantially uniform therethrough while extracting heat of reaction through heat exchange surfaces to hold the temperature of said mixture at about 40° C. to 80° C. until said liquid mass evidences substantially no tendency to rise in temperature, whereby the product formed is an unpolymerized intermediate characterized by its ability to remain in such state over a prolonged period of time; subsequently transferring said liquid mass to an open casting mold; raising its temperature to between about 140° C. and 160° C. and holding it at said temperature for a period of time, thereby to form said mass into a polymerized body having all amino-type polymerization linkage therein.

2. The process of claim 1 wherein said amine is one selected from the group consisting of aniline, toluidine, phenetidine, cyclohexylamine and xylidine.

3. The process for the production of tough, high-impact type of open mold castings which comprises admixing the tetra glycidyl ether of pentaerythritol and aniline in amounts such that there is one amino hydrogen of the aniline to each of the 1,2-epoxy groups of the epoxy compound, stirring the mixture to keep the temperature therein substantially uniform therethrough while extracting heat of reaction through heat exchange surfaces to hold the temperature of said mixture at about 40° C. to 80° C. until said liquid mass evidences substantially no tendency to rise in temperature, whereby the product formed is an unpolymerized intermediate characterized by its ability to remain in such state over a prolonged period of time; subsequently transferring said liquid mass to an open casting mold; raising its temperature to between about 140° C. and 160° C. and holding it at said temperature for a period of time, thereby to form said mass into a polymerized body having all amino-type polymerization linkage therein.

4. The polymerized product obtained in accordance with claim 3.

5. The process for the production of tough, high-impact type open mold castings through the copolymerization of epoxy compounds with amines while controlling the exothermic heat of reaction during said production, which comprises: providing an epoxy compound having only terminal 1,2-epoxy groups, with no other cyclic structure or functional groups in their molecular structure, and wherein the number of said epoxy groups is a number from 3 to 4; admixing with said epoxy compound a primary mono amine, the amount of said amine being such that there is one amino hydrogen for each said 1,2-epoxy group of said epoxy compound, and said amine being one characterized by the possession of steric hindrance relative to the reaction of the second amino hydrogen of said amine with said epoxy compound to an extent such that the first amino hydrogen of said amine will be substantially completely reacted with said epoxy compound to the substantial exclusion of the reaction of said second amino hydrogen as evidenced and measured by the fact that when the said amine is mixed with one of said epoxy compounds in the aforesaid ratio and the temperature of the mixture is held between 40° C. and 80° C., the amine and said epoxy compound will react slowly to form first an unpolymerized intermediate which will fall in temperature through continued cooling and which will require the application of heat to effect reaction of the mass to a final polymeric compound; stirring the mixture to keep the temperature therein substantially uniform therethrough while extracting heat of reaction through heat exchange surfaces to hold the temperature of said mixture at about 40° C. to 80° C. until said liquid mass evidences substantially no tendency to rise in temperature, whereby the product formed is an unpolymerized intermediate characterized by its ability to remain in such state over a prolonged period of time; subsequently transferring said liquid mass to an open casting mold; raising its temperature to between about 140° C. and 160° C. and holding it at said temperature for a period of time, thereby to form said mass into a polymerized body having all amino-type polymerization linkage therein.

References Cited in the file of this patent

UNITED STATES PATENTS

| | | |
|---|---|---|
| 2,098,097 | Hopff | Nov. 2, 1937 |
| 2,136,928 | Schlack | Nov. 15, 1938 |
| 2,444,333 | Castan | June 29, 1948 |
| 2,510,885 | Greenlee | June 6, 1950 |
| 2,553,718 | Newey et al. | May 22, 1951 |
| 2,642,412 | Newey et al. | July 16, 1953 |
| 2,801,229 | De Hoff et al. | July 30, 1957 |
| 2,912,389 | Phillips et al. | Nov. 10, 1959 |
| 2,917,469 | Phillips et al. | Dec. 15, 1959 |